United States Patent [19]

Pla et al.

[11] Patent Number: 5,558,298
[45] Date of Patent: Sep. 24, 1996

[54] ACTIVE NOISE CONTROL OF AIRCRAFT ENGINE DISCRETE TONAL NOISE

[75] Inventors: Frederic G. Pla; Harindra Rajiyah, both of Clifton Park, N.Y.

[73] Assignee: General Electric Company, Schenectady, N.Y.

[21] Appl. No.: 349,285

[22] Filed: Dec. 5, 1994

[51] Int. Cl.$^6$ .......................... B64D 29/00; F02C 7/045
[52] U.S. Cl. .................... 244/1 N; 244/1 R; 244/134 R; 244/134 D; 244/53 R; 415/118; 415/119; 310/322; 310/324
[58] Field of Search .................................. 244/1 N, 1 R, 244/134 R, 134 D, 53 R; 415/119, 118; 181/206; 381/64, 71; 340/388.1, 388.3; 310/322–324

[56]  References Cited

U.S. PATENT DOCUMENTS

| | | | |
|---|---|---|---|
| 1,688,743 | 10/1928 | Nicolson . | |
| 3,509,387 | 4/1970 | Thorn et al. | 310/324 |
| 3,707,131 | 12/1972 | Massa | 310/324 |
| 3,792,204 | 2/1974 | Murayama et al. | 310/322 |
| 3,894,198 | 7/1975 | Murayama et al. | 310/322 |
| 4,047,060 | 9/1977 | Schafft | 310/322 |
| 4,545,553 | 10/1985 | Finke et al. | 310/324 |
| 4,551,849 | 11/1985 | Kasai et al. . | |
| 4,593,160 | 6/1986 | Nakamura | 310/324 |
| 4,700,177 | 10/1987 | Nakashima et al. . | |
| 4,715,559 | 12/1987 | Fuller . | |
| 4,751,419 | 6/1988 | Takahata . | |
| 4,947,434 | 8/1990 | Ito . | |
| 5,031,222 | 7/1991 | Takaya . | |

FOREIGN PATENT DOCUMENTS 2124598   5/1990   Japan .

OTHER PUBLICATIONS

Concurrently filed U.S. patent application RD–23996, Frederick G. Pla and Harindra Rajiyah, entitled "Active Vibration Control of Structures Undergoing Bending Vibrations".

U.S. patent application Ser. No. 08/051,810, filed Apr. 21, 1993, Frederick G. Pla, entitled "Active Control of Aircraft Engine Noise Using Vibrational Inputs".

U.S. patent application Ser. No. 08/143,602, filed Nov. 1, 1993, Frederick G. Pla et al., entitled "Active Noise Control Using Noise Source Having Adaptive Resonant Frequency Tuning Through Stiffness Variation".

U.S. patent application Ser. No. 08/143,605, Filed Nov. 1, 1993, Pla et al., entitled "Active Noise Control Using Noise Source Having Adaptive Resonant Frequency Tuning Through Stress Variation".

U.S. patent application Ser. No. 08/143,604, Filed Nov. 1, 1993, Pla et al., entitled "Active Noise Control Using Noise Source Having Adaptive Resonant Frequency Tuning Through Variable Panel Loading".

U.S. patent application Ser. No. 08/143,603, Filed Nov. 1, 1993, Pla et al., entitled "Active Noise Control Using Noise Source Having Adaptive Resonant Frequency Tuning Through Variable Ring Loading".

*Primary Examiner*—Andres Kashnikow
*Assistant Examiner*—Tien Dinh
*Attorney, Agent, or Firm*—Douglas E. Erickson; Marvin Snyder

[57]   ABSTRACT

An active noise control subassembly for an aircraft engine. An aircraft engine noise radiating panel is bendably vibratable to generate a canceling noise generally opposite in phase to at least a portion of the discrete tonal noise produced by the engine. A piezoceramic actuator plate is vibratable by an applied electric AC signal. The plate is connected to the panel such that vibrations in the plate cause bending vibrations in the panel and such that the plate is compressively prestressed along the panel when the panel is free of bending vibrations. The compressive prestressing increases the amplitude of the canceling noise before the critical tensile stress level of the plate is reached. Preferably, a positive electric DC bias is also applied to the plate in its poling direction to increase the amplitude of the canceling noise before the sum of the AC signal and DC bias exceeds the depolarization voltage in a direction opposite to the poling direction.

10 Claims, 2 Drawing Sheets

5,558,298

1

ACTIVE NOISE CONTROL OF AIRCRAFT ENGINE DISCRETE TONAL NOISE

This invention described herein was made in the performance of work under NASA Contract No. NAS3-26617 and is subject to the provisions of Section 305 of the National Aeronautics and Space Act of 1958 (42 U.S.C. 2457).

BACKGROUND OF THE INVENTION

The present invention relates generally to reducing discrete tonal noise from aircraft engines, and more particularly to an active noise control subassembly capable of generating a canceling noise to offset such engine noise.

Discrete tonal noise may have one or more discrete frequencies. Aircraft engines produce discrete tonal noise, especially from fans and turbines. Such noise from larger aircraft engines, presently under development, may pose a problem in the vicinity of airports during aircraft take off and landing operations. Also, future aircraft noise regulations may pose a problem for existing aircraft engines.

Known passive noise control techniques for reducing aircraft engine discrete tonal noise include noise absorbing liners and tuned resonators usually mounted at the engine inlet and outlet to reduce the level of discrete tones radiated outside the engine. However, the effectiveness of passive noise control treatment would be greatly reduced for engines with large fan diameters because of the lower fan blade passage frequency.

Known active noise control techniques for reducing aircraft engine discrete tonal noise generate a canceling noise forward and aft of the fan. The frequency of the canceling noise is equal to the blade passage frequency (and/or multiples thereof) as determined from engine speed using a tachometer. The amplitude and phase of the canceling noise is determined by a computer using feedback and/or feed-forward control techniques with sound inputs from a microphone array disposed in the vicinity of the fan and the canceling noise such that the canceling noise is generally equal in amplitude and opposite in phase to the engine's discrete tonal noise. Conventional techniques for generating the canceling noise include using piezoceramic actuator plates to bendably vibrate a panel to produce the canceling noise. The panel may be a part of the aircraft engine, such as a part of the fan shroud, or the panel may be a member which is separate from, but attached to, the aircraft engine. The piezoceramic plate is driven by an electric AC signal such that when the signal is positive, the plate causes the panel to bendably deflect in a first direction from its resting state, and when the signal is negative, the plate causes the panel to bendably deflect in the opposite direction.

The larger the amplitude of the electric AC signal driving the piezoceramic actuator plate, the larger the bending vibration, and hence the louder the canceling noise, produced by the attached panel. However, the piezoceramic actuator plate will structurally fail when the applied electric AC signal causes the plate to exceed its critical tensile stress (which is smaller than its critical compressive stress). It is noted that the particular value of the critical tensile (or compressive) stress depends on the particular piezoceramic material being used. What is needed is an improved subassembly, of an active noise control system, for generating a loud canceling noise to reduce discrete tonal noise produced by an aircraft engine.

SUMMARY OF THE INVENTION

It is an object of the invention to provide an active noise control subassembly for an aircraft engine, wherein the subassembly is capable of generating a canceling noise required by an active noise control system for reducing discrete tonal noise produced by the engine.

The active noise control subassembly of the invention is for an aircraft engine producing discrete tonal noise. The subassembly includes an aircraft engine noise radiating panel and a first piezoceramic actuator plate. The panel is bendably vibratable to generate a canceling noise generally opposite in phase to at least a portion of the discrete tonal noise of the engine, and the panel has first and second generally opposing sides. The first plate is vibratable by a first applied electric AC signal, and the first plate is connected to the first side of the panel such that vibrations in the first plate cause bending vibrations in the panel and such that the first plate is compressively prestressed along the panel when the panel is free of the bending vibrations.

In a preferred embodiment, the first plate is compressively prestressed along the panel to a value not exceeding (and preferably equal to) generally half the absolute value of the first plate's critical compressive stress minus half the absolute value of the first plate's critical tensile stress.

Several benefits and advantages are derived from the invention. The compressively prestressed first piezoceramic actuator plate can be driven by a larger-amplitude applied electric AC signal than can a non-prestressed first piezoceramic actuator plate. Thus, with the invention, a louder canceling noise can be produced by the panel.

BRIEF DESCRIPTION OF THE DRAWINGS

The accompanying drawings illustrate a preferred embodiment of the present invention wherein.

DETAILED DESCRIPTION OF THE INVENTION

Figure 1:
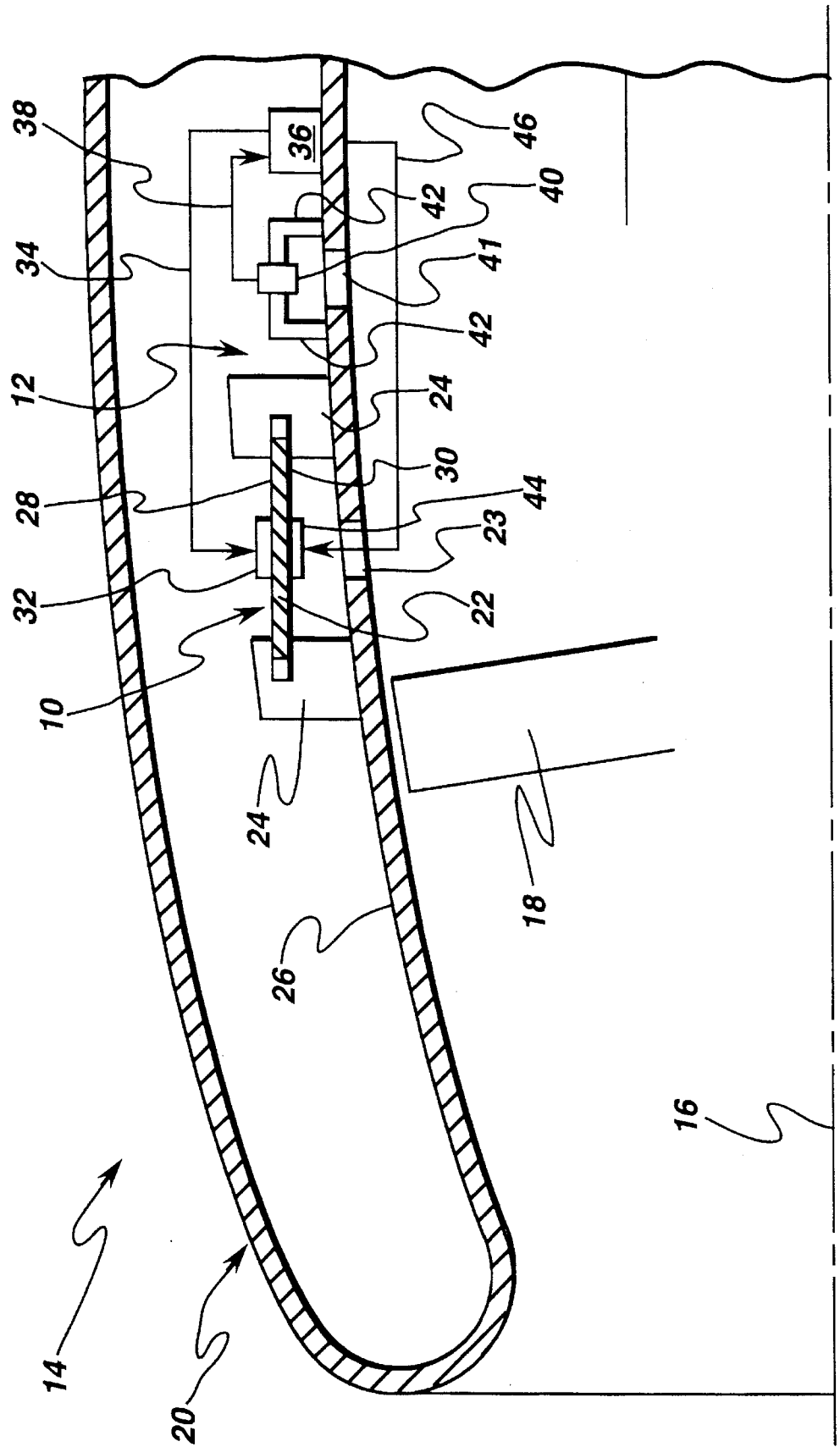
FIG. 1 is a schematic side-elevational, cross-sectional view of a front portion of an aircraft engine including a preferred embodiment of the active noise control subassembly of the invention.

Referring now to the drawings, wherein like numerals represent like elements throughout, FIGS. 1–4 show the active noise control subassembly 10 of the present invention. The active noise control subassembly 10, which is part of an active noise control system 12, is for an aircraft engine 14 (only the front portion of which is shown in FIG. 1 ). The aircraft engine 14, which has a generally longitudinally extending centerline 16, includes a fan 18 which rotates within a fan nacelle 20 producing discrete tonal noise predominately at the blade passage frequency and multiples thereof, as can be appreciated by those skilled in the art. It is noted that aircraft engines without fans also produce discrete tonal noise, such as, but not limited to, noise coming from their turbine blades (such turbine blades being omitted from FIG. 1 for clarity).

The active noise control subassembly 10 includes an aircraft engine noise radiating panel 22 bendably vibratable to generate a canceling noise generally opposite in phase to at least a portion of the discrete tonal noise of the aircraft engine 14. In some applications, the noise radiating panel is an already existing aircraft engine member, such as the aircraft engine fan shroud (not shown in the figures). In other applications, such as that shown in FIG. 1, the noise radiating panel 22 is a separate member (such as a sheet of 1.5 millimeter thick aluminum) specifically installed in the aircraft engine 14 for noise control purposes. In a preferred installation, the noise radiating panel 22 is disposed within the fan nacelle 20 over a sound port 23 in the inner wall 26 of the fan nacelle 20 and attached to supports 24 which are secured to the inner wall 26 of the fan nacelle 20. The noise radiating panel 22 has first and second generally opposing sides 28 and 30.

The active noise control subassembly 10 also includes a first piezoceramic actuator plate 32 which is vibratable by a first applied electric AC signal 34 generated by a controller 36. The first piezoceramic actuator plate 32 is connected to the first side 28 of the noise radiating panel 22 such that vibrations in the first plate 32 cause bending vibrations in the panel 22 and such that the first plate 32 is compressively prestressed along the panel 22 when the panel 22 is free of such bending vibrations. The first applied electric AC signal 34 generated by the controller 36 is such that the bending vibrations in the noise radiating panel 22 produce a canceling noise generally opposite in phase to at least a portion of the discrete tonal noise of the aircraft engine 14. In an exemplary embodiment, such discrete tonal noise of the aircraft engine 14 is calculated by the controller 36 in part from engine speed measured by a tachometer (omitted from FIG. 1 for clarity) and in part from a signal 38 of aircraft engine noise from a microphone 40 disposed within the fan nacelle 20 over a sound port 41 in the inner wall 26 of the fan nacelle 20 and attached to supports 42 which are secured to the inner wall 26 of the fan nacelle 20. A best mode would use an array of microphones 40 flush mounted to the inner wall 26 (such arrangement not shown in the figures). The controller 36 may be a digital or analog computer or other control device, as is known to those skilled in the art. It is noted that the active noise control system 12 includes the active noise control subassembly 10, the microphone 40, the tachometer (omitted from FIG. 1 for clarity), and the controller 36. A best mode would employ a system 12 forward and aft of the fan 18.

For purposes of describing the invention, the term "piezoceramic" refers to a material which exhibits a piezoelectric effect and is not limited to commonly called piezoceramic materials but also includes electrostrictive materials while excluding magnetostrictive materials. Typically, the first piezoceramic actuator plate 32 is a sheet (e.g., 50×50×0.25 millimeters) of piezoceramic material bonded to the flat or curved noise radiating panel 22 using an epoxy or alkyl cyanolate compound. Vacuum pads or weights are sometimes used during the bonding process to apply a uniform pressure on the first plate 32, especially when bonding the plate to a curved panel surface. A preferred method for creating the compressive prestress of the first plate 32 is to create the compressive stress during the bonding process as follows: 1) bend the edges of the noise radiating panel 22 away from the first piezoceramic actuator plate 32 (as in FIG. 4) so the shape of the deformation follows the mode shape to be excited; 2) bond the first plate 32 to the panel 22; and 3) release the panel 22 so the panel 22 goes back to its original shape with the first plate 32 now having an applied compressive prestress. The panel 22 can be bendably deformed over a molding tool (not shown) having a face which follows the mode shape of interest. The molding tool face may have holes allowing a vacuum to be drawn to bendably deform and hold the panel 22 onto the molding tool face. Instead of using a molding tool, the panel 22 can be bendably deformed over the front surface of a molding plate (not shown). The back surface of the molding plate may be enclosed in a sealed chamber which is pressurized with gas so the molding plate follows the mode shape of interest. Another preferred method for creating the compressive prestress is to heat the panel 22, then bond the first plate 32 to the heated panel, and then allow the panel 22 to cool to room temperature which will give the connected first plate 32 an applied compressive prestress as long as the thermal expansion coefficient of the panel 22 is greater than that of the first plate 32.

In an exemplary embodiment, the active noise control subassembly 10 further includes a second piezoceramic actuator plate 44 which is vibratable by a second applied electric AC signal 46 generated by the controller 36. The second piezoceramic actuator plate 44 is connected to the second side 30 of the noise radiating panel 22 such that vibrations in the second plate 44 cause bending vibrations in the panel 22 and such that the second plate 44 is compressively prestressed along the panel 22 when the panel 22 is free of such bending vibrations. The second applied electric AC signal 46 generated by the controller 36 is such that the bending vibrations in the noise radiating panel 22 produce a canceling noise generally opposite in phase to at least a portion of the discrete tonal noise of the aircraft engine 14. It is noted that the first and second piezoceramic actuator plates 32 and 44 are powered "out-of-phase" so that, for example, the first plate 32 expands while the second plate 44 contracts. When two piezoceramic actuator plates 32 and 44 are used, it is preferred that their combined effect results in causing bending vibrations in the noise radiating panel 22 which produce a canceling noise which is generally equal in amplitude to the aircraft engine discrete tonal noise. It is also preferred that when only one piezoceramic actuator plate 32 or 44 is used, its effect results in causing bending vibrations in the panel 22 which produce a canceling noise generally equal in amplitude to the aircraft engine discrete tonal noise.

Preferably, the first plate 32 and the second plate 44 are each compressively prestressed along the panel 22 to a value of at least generally 100 Newton - square meters. As with all piezoceramic materials, the first and second piezoceramic actuator plates 32 and 44 each have a critical compressive stress and a critical tensile stress, wherein the absolute value of the critical compressive stress of each plate 32 and 44 is greater than the absolute value of its critical tensile stress. In an exemplary embodiment, each plate 32 and 44 is compressively prestressed along the panel 22 to a value not exceeding (and preferably equal to) generally half the absolute value of its critical compressive stress minus half the absolute value of its critical tensile stress. The benefit of compressive prestressing may be seen by way of the following example. For purposes of illustration only, assume that a piezoceramic actuator plate has a critical compressive stress of +11 units and a critical tensile stress of −1 units. Without the compressive prestress of the present invention, the first piezoceramic actuator plate 32 could vibrate in compression and tension with an amplitude of only 1 unit between +1 and −1 units which would result in modest bending vibrations in the noise radiating panel 22 generating a lower-amplitude canceling noise. Driving the first plate 32 to larger vibrations in compression and tension would destroy the first plate 32 once its critical tensile stress of −1 units were exceeded. With the preferred compressive prestress of +5 units, the first piezoceramic actuator plate 32 can vibrate in compression and tension with an amplitude of 6 units about the +5 unit compressive prestress level which would result in larger bending vibrations in the noise radiating panel 22 and a louder generated canceling noise. It is noted that compressive prestressing to a value less than generally 100 Newton - square meters would have no appreciable benefit, as can be appreciated by those skilled in the art.

Figure 2:
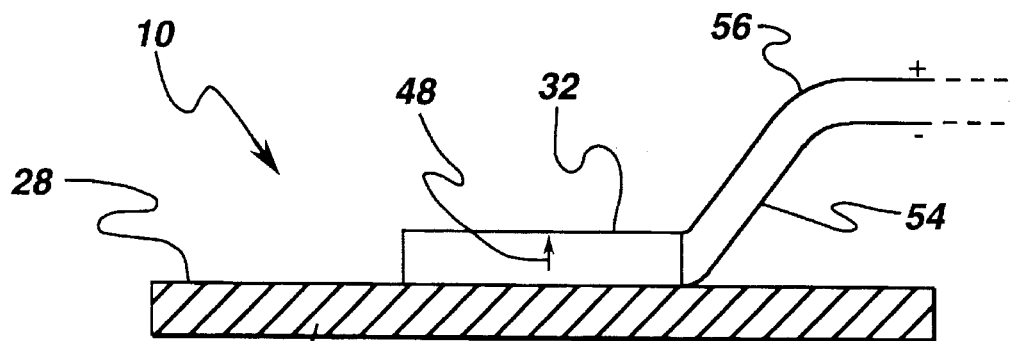
FIG. 2 is an enlarged view of the subassembly of FIG. 1 showing a non-vibrating aircraft engine noise radiating panel.
Figure 3:
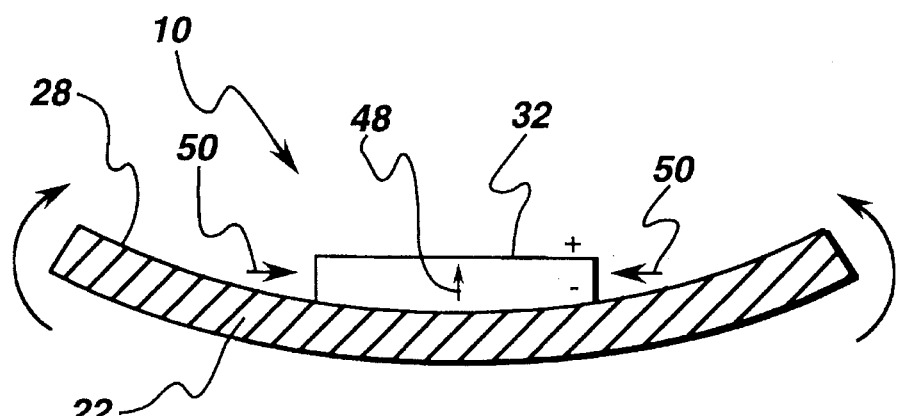
FIG. 3 is a view of the subassembly of FIG. 2 showing a bendably vibrating panel displaced in a first direction.
Figure 4:
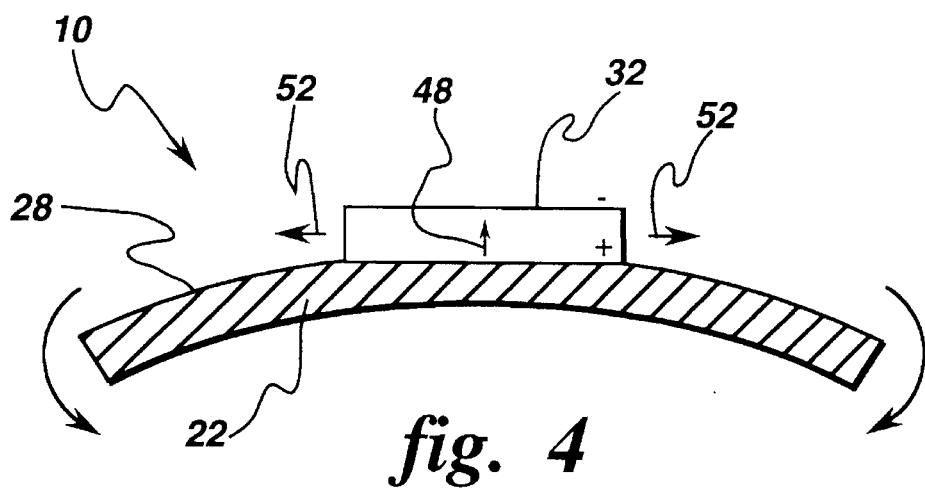
FIG. 4 is a view of the subassembly of FIG. 2 showing a bendably vibrating panel displaced in the opposite direction.

As with all piezoceramic materials, the first piezoceramic actuator plate 32 has a poling direction 48 seen in FIG. 2. In FIGS. 2–4, the second plate 44 has been omitted for clarity. The poling direction 48 represents the "electrical" axis of the material. As seen in FIG. 3, an electric field (represented by the lower "−" symbol and the upper "+" symbol) applied in the poling direction 48 causes contraction (i.e., compression) of the first plate 32 along arrows 50. As seen in FIG. 4, an electrical field (represented by the upper "−" symbol and the lower "+" symbol) applied opposite to the poling direction 48 causes expansion (i.e., tension) of the first plate 32 along arrows 52. Unnumbered arrows indicate the direction of bending in the panel 22 caused by the contraction and expansion in the first plate 32.

In a preferred embodiment, as seen in FIG. 2, the first plate 32 has a positive electric DC bias in the poling direction 48 (indicated by the "−" symbol near wire 54 and the "+" symbol near wire 56, with the wires 54 and 56 being attached to the first plate 32). Preferably, the positive electric DC bias in the poling direction 48 has a value of at least generally 5 volts. All piezoceramic materials have a first depolarization voltage in the poling direction 48 and a second depolarization voltage in a direction generally opposite to the poling direction, wherein the absolute value of the first depolarization voltage is greater than the absolute value of the second depolarization voltage. A piezoceramic material will not contract beyond its first depolarization voltage and will not expand beyond its second depolarization voltage. In an exemplary embodiment, the positive electric DC bias in the poling direction 48 has a value not exceeding (and preferably equal to) generally half the absolute value of the first depolarization voltage minus half the absolute value of the second depolarization voltage.

As can be appreciated by those skilled in the art, the effects and benefits of applying a positive electric DC bias in the poling direction 48 to the first piezoceramic actuator plate 32 are similar to the benefits of applying a compressive prestress to the first plate 32. Basically, the added positive electric DC bias in the poling direction 48 shifts the first applied electric AC signal 34 away from the limiting second depolarization voltage which allows the first AC signal 34 to have a larger amplitude resulting in a louder canceling noise. It is noted that a positive electric DC bias in the poling direction 48 can be applied equally well to the second piezoceramic actuator plate 44. Preferably, a positive electric DC bias in the poling direction 48 should only be applied to a compressively prestressed piezoceramic actuator plate, as can be understood by those skilled in the art from an appreciation of the present invention.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. An active noise control subassembly for an aircraft engine, said engine producing discrete tonal noise, and said subassembly comprising:

a) an aircraft engine noise radiating panel bendably vibratable to generate a canceling noise generally opposite in phase to at least a portion of said discrete tonal noise of said aircraft engine, said panel having first and second generally opposing sides; and b) a first piezoceramic actuator plate vibratable by a first applied electric AC signal, said first plate connected to said first side of said panel such that vibrations in said first plate cause bending vibrations in said panel and such that said first plate is compressively prestressed along said panel when said panel is free of said bending vibrations.

2. The subassembly of claim 1, wherein said first plate is compressively prestressed along said panel to a value at room temperature of at least generally 100 Newton - square meters.

3. The subassembly of claim 2, wherein said first plate has a critical compressive stress and a critical tensile stress, wherein the absolute value of said critical compressive stress is greater than the absolute value of said critical tensile stress, and wherein said first plate is compressively prestressed along said panel to a value not exceeding generally half the absolute value of said critical compressive stress minus half the absolute value of said critical tensile stress.

4. The subassembly of claim 3, wherein said first plate is compressively prestressed along said panel to a value equal to generally half the absolute value of said critical compressive stress minus half the absolute value of said critical tensile stress.

5. The subassembly of claim 1, also including a second piezoceramic actuator plate vibratable by a second applied electric AC signal, said second plate connected to said second side of said panel such that vibrations in said second plate cause bending vibrations in said panel and such that said second plate is compressively prestressed along said panel when said panel is free of said bending vibrations.

6. The subassembly of claim 5, wherein said second plate is compressively prestressed along said panel to a value at room temperature of at least generally 100 Newton - square meters.

7. The subassembly of claim 1, wherein said first plate has a poling direction and a positive electric DC bias in said poling direction.

8. The subassembly of claim 7, wherein said positive electric DC bias has a value of at least generally 5 volts.

9. The subassembly of claim 8, wherein said first plate has a first depolarization voltage in said poling direction and a second depolarization voltage in a direction generally opposite to said poling direction, wherein the absolute value of said first depolarization voltage is greater than the absolute value of said second depolarization voltage, and wherein said positive electric DC bias has a value not exceeding generally half the absolute value of said first depolarization voltage minus half the absolute value of said second depolarization voltage.

10. The subassembly of claim 9, wherein said positive electric DC bias has a value generally equal to half the absolute value of said first depolarization voltage minus half the absolute value of said second depolarization voltage.

* * * * *